(12) United States Patent
Nakayasu et al.

(10) Patent No.: US 7,293,797 B2
(45) Date of Patent: Nov. 13, 2007

(54) INFLATOR

(75) Inventors: Masayuki Nakayasu, Himeji (JP); Nobuyuki Katsuda, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 248 days.

(21) Appl. No.: 10/678,088

(22) Filed: Oct. 6, 2003

(65) Prior Publication Data

US 2005/0173906 A1    Aug. 11, 2005

Related U.S. Application Data

(60) Provisional application No. 60/417,309, filed on Oct. 10, 2002.

(30) Foreign Application Priority Data

Oct. 7, 2002    (JP)    ............................. 2002-293242

(51) Int. Cl.
 B60R 21/26    (2006.01)
 B60R 21/268    (2006.01)
(52) U.S. Cl. ...................................... 280/737; 280/736
(58) Field of Classification Search ................ 280/740, 280/736, 741, 737; 222/5; 137/68.29, 68.3; 220/89.3
See application file for complete search history.

(56) References Cited

U.S. PATENT DOCUMENTS 5,263,740 A * 11/1993 Frey et al. .................. 280/737
5,423,570 A * 6/1995 Kort et al. .................. 280/736
5,582,428 A * 12/1996 Buchanan et al. .......... 280/737
5,653,463 A * 8/1997 Jeong ......................... 280/737
5,678,856 A * 10/1997 Headley ..................... 280/737
5,854,441 A 12/1998 Metzger
6,099,033 A * 8/2000 Jenkins et al. .............. 280/737
6,247,725 B1 6/2001 Möller
6,295,935 B1 * 10/2001 Swann et al. ............... 102/530
6,386,583 B1 * 5/2002 Erike ......................... 280/737
6,543,806 B1 * 4/2003 Fink ........................... 280/737
6,588,796 B2 * 7/2003 Webber et al. .............. 280/737
6,629,703 B2 * 10/2003 Horton et al. .............. 280/737
6,669,232 B2 * 12/2003 Specht ........................ 280/736
6,676,157 B2 * 1/2004 Nanbu ........................ 280/736
6,722,694 B1 4/2004 Nakashima et al.
6,834,885 B2 * 12/2004 Mizuno et al. ............. 280/737
6,848,713 B2 * 2/2005 Nakashima et al. ........ 280/741
2002/0036399 A1 3/2002 Nanbu (Continued)

FOREIGN PATENT DOCUMENTS

EP    1291611 A2    3/2003

(Continued)

*Primary Examiner*—Eric Culbreth
*Assistant Examiner*—Barry Gooden, Jr.
(74) *Attorney, Agent, or Firm*—Birch, Stewart, Kolasch & Birch, LLP (57) ABSTRACT

An igniter 26 accommodated in a diffuser portion 20 has, on a peripheral face of a cup 28 covering an igniting portion, a hole 29 covered with a sealing tape from the inside of the cup, and the hole 29 exactly opposes the rupturable plate 19. When the igniter 26 is actuated, a rupturing energy is intensively discharged from the hole 29 to the rupturable plate 19, so that the rupturing ability of the rupturable plate 19 can be improved.

14 Claims, 6 Drawing Sheets

U.S. PATENT DOCUMENTS

| | | |
|---|---|---|
| 2002/0180195 A1 | 12/2002 | Nanmu |
| 2003/0057690 A1 | 3/2003 | Dolling et al. |
| 2005/0140128 A1 | 6/2005 | Schafer |

FOREIGN PATENT DOCUMENTS

| | | |
|---|---|---|
| JP | 10-100849 A | 4/1998 |
| JP | 10-147204 A | 6/1998 |
| JP | 2001-515816 A | 9/2001 |
| JP | 2002-46569 A | 2/2002 |
| JP | 2002-172995 A | 6/2002 |
| JP | 2002-211346 A | 7/2002 |
| JP | 2002-276896 A | 9/2002 |
| JP | 2002-347567 A | 12/2002 |
| WO | WO 03/068567 A1 | 8/2003 |

* cited by examiner

INFLATOR

CROSS-REFERENCE TO RELATED APPLICATIONS

This Nonprovisional application claims priority under 35 U.S.C. § 119(e) on U.S. Provisional Application No. 60/417,309 filed on Oct. 10, 2002 and under 35 U.S.C. § 119(a) on Patent Application No. 2002-293242 filed in Japan on Oct. 7, 2002, the entire contents of which are hereby incorporated by reference.

BACKGROUND OF THE INVENTION

1. Field of the Invention

The present invention relates to an inflator suitable for an air bag system for an automobile.

2. Description of the Related Art

As an inflator for an inflating type safety system of an automobile, in order to optimally protect a passenger in accordance with a position of a seat in a vehicle such as a driver side, a passenger side and the like, various inflators are generally used. As such inflators, there have been known ones where such a pressurized gas as argon, helium or the like is used as an inflating means for an air bag.

In such an inflator, since an outflow of a pressurized gas is started by rupture of a rupturable plate and an air bag is inflated and developed finally, it is important to improve the rupturing ability of the rupturable plate for enhancing an activation reliability of the inflator. Further, a structure of the inflator is required to be simplified as much as possible in order to meet demands for size and weight reduction. Besides, there is a demand for simplification of an assembling process or the like.

In Japanese Patent Publication No. 2002-172995, there is disclosed an invention relating to a stored gas inflator. In FIG. 2 of the Japanese Publication a main chamber and a small chamber are formed, a communication hole and a small hole are formed in a separation wall disposed between these chambers, and rupturable plates (first and second burst shims) are mounted to a gas ejecting hole formed in the small chamber and the communication hole. An initiator 30 is provided in a pressurized atmosphere inside the small chamber, and in the description of the Japanese Publication, it is described that the rupturable plate can be ruptured even by an igniter with a small output. However, in this inflator, there are the following problems.

In this inflator, even the small chamber is maintained in a pressurized atmosphere. In paragraph of the description of the Japanese Publication, there is a statement that "P2 is approximately equal to or slightly smaller than (P1-Pm)." Here, P2 represents a rupturing pressure for rupturing the rupturable plate, P1 represents a rupturing pressure for rupturing the rupturable plate, and Pm represents a charging pressure of a gas charged in the small chamber and the main chamber. Considering the content of this disclosure, when the pressure in the small chamber becomes higher than that in the main chamber due to activation of the initiator 30, there occurs no problem when the two rupturable plates are simultaneously ruptured. However, in case that the rupturable plate has been ruptured first, since the pressure in the small chamber escapes to the main chamber, a pressure rising in the entire of the small chamber and the main chamber becomes small, so that the rupturable plate is not ruptured and an air bag can not be normally inflated. Further, the rupturable plate is not provided in the extension of the advancing direction of the impact wave at the time of activation of the initiator, which obviously is less reliable in view of rupturing the rupturable plate.

FIG. 3 of the same publication discloses a structure in which an igniter is disposed such that its distal end is directed to the rupturable plate. However, since a pressurized medium exists in the main chamber and the small chamber separately, two rupturable plates are required, which makes the structure complicated.

In U.S. patent Publication No. 2002/0093182, an inflator which ruptures a rupturable plate 9 by projecting a piston 23 is disclosed, as shown in FIGS. 1 to 3. Paragraph and FIG. 4 of the US Patent Publication clearly explain that a hole is formed in a portion of the periphery of a member accommodating an igniter, an end portion of a member is entwisted therein and the piston is disposed inside. However, with such a projectile mechanism of the piston, the number of parts is increased and maintenance of size accuracy is complicated because of many small parts, and there is still room for improvement in these points.

SUMMARY OF THE INVENTION

The present invention provides an inflator that enables an easy mounting work of the inflator to an inflator module, and reliability in activation of the inflator can be enhanced.

A first aspect of the present invention provides an inflator comprising a cylindrical inflator housing which is closed at one end thereof and is opened at the other end and in which a pressurized gas is charged, and a diffuser portion which is connected to an opening portion of the inflator housing, accommodates an igniter and has a gas discharge port, wherein at least one portion of a gas discharge passage extending from the inflator housing to the gas discharge port of the diffuser portion is closed by a flat plate-shaped rupturable plate;

an igniter for rupturing the rupturable plate is disposed such that an axial direction of the inflator housing is orthogonal to an axial direction of the igniter and the axial direction of the igniter is not exactly opposite to a surface of the flat plate-shaped rupturable plate; and means for directing a rupturing energy generated by activation of the igniter in the exactly opposite direction to rupture the rupturable plate.

The rupturable plate is mounted to an opening portion of the inflator housing or inside the diffuser portion. The rupturable plate is like a flat plate to be mounted, but it receives a pressure of a pressurized gas and deforms into a bowl-like shape after the pressurized gas is charged.

Since the igniter is disposed such that the axial direction of the inflator housing and the axial direction of the igniter are orthogonal to each other, the entire inflator can be made compact as compared with a case where, when the igniter is mounted in the same axial direction as the axial direction of the inflator housing, an additional member for gas discharging is required.

When the inflator is connected to a module in which an air bag is accommodated, it is eventually connected to a portion of the gas discharge port of the diffuser portion. However, when the igniter is mounted in the same manner as the present invention, a lead wire connected to an igniter can be extended in an opposite direction to the air bag, so that the lead wire does not interfere with a module connection at a time of mounting the inflator to the module.

By arranging, inside the diffuser, means (for directing a rupturing energy to act) for discharging a rupturing energy (an integrated energy produced by an impact wave, a pressure rising and the like) generated by activation of the igniter in the same direction as the axial direction of the inflator housing inside the diffuser, even if a rupturing energy from the igniter is dispersed, it can be focused on the rupturable plate, so that the rupturing ability of the rupturable plate can be enhanced.

The igniter may have a fragile portion at a portion exactly opposite to the rupturable plate, the fragile portion may be ruptured at an activation of the inflator and a rupturing energy may act on the rupturable plate from the fragile portion.

Since the igniter (an electric type igniter) has an igniting portion provided with a priming and the igniting portion is covered with a cup made from aluminum or the like, by providing the fragile portion in the cup, an ignition energy (rupturing energy) is discharged from the fragile portion when the igniter is activated.

The fragile portion provided in the igniter may be constituted with a combination of a hole(s) provided in a side face of a cup member covering the igniting portion of the igniter and a sealing tape closing the hole(s) from the inside of the cup member.

When the igniter is activated, the sealing tape is broken by a rupturing energy to open a hole(s) and the rupturing energy is discharged from the hole(s) towards the rupturable plate.

The fragile portion provided in the igniter may comprise a portion surrounded by a groove or a portion provided with a notch, which is provided in a side face of a cup member covering the igniting portion of the igniter.

The portion surrounded by the groove, which serves as the fragile portion, is one such as, for example, a groove formed in a circular shape(a continuous groove or a dotted line groove, which does not perforate). In the case of the circular groove, a portion defined by the circular groove of the cup wall receives a rupturing energy to rupture in a circular shape and to produce a hole. The rupturing energy is discharged from the hole towards the rupturable plate.

The portion with a notch, which serves as the fragile portion, is one such as, for example, a notch formed in a cross shape in the cup (a continuous notch or a dotted line notch which does not perforate). In the case of a notch like a cross mark, a notch in the cup wall receives a rupturing energy and the cup wall is turned up at four sides to produce a hole, and the rupturing energy is discharged from the hole towards the rupturable plate. Incidentally, it is preferable that the notch is sealed by a thin sealing tape or the like in order to prevent a priming from leaking from the notch portion or prevent moisture from entering therefrom. Alternatively, the notch may not be a cross mark, but it may be a perforating notch formed as an annular broken line.

A guiding passage for guiding a rupturing energy discharged from the igniter to the rupturable plate may be formed in the diffuser portion, and a rupturing energy may be guided to a central portion of the rupturable plate or a portion thereof near the central portion by action of the guiding passage.

As long as the guiding passage can guide a rupturing energy to the rupturable plate securely, its shape, structure or the like is not limited to a specific one. By providing such a guiding passage, the rupturable plate is ruptured unfailingly and easily.

It is preferable that the guiding passage for guiding a rupturing energy discharged from the igniter to the rupturable plate comprises a cap which surrounds at least the igniting portion of the igniter and is disposed in the direction orthogonal to the axial direction of the inflator housing and a hole which is provided at a position, on a side face of the cap, which is correctly opposed to the rupturable plate.

The shape and the structure of the cup are not limited specifically, and it may be a cylindrical cap which surrounds the igniting portion of the igniter at its one end opening portion and abuts on an inner wall face of the diffuser portion at the other end opening portion.

Since the cap is positioned in the gas discharge passage, the diameter of the cap is set to be smaller than the diameter of the gas discharge passage not to block a smooth flow of the pressurized gas. It is further preferable that the length of the cap is also adjusted as well as the diameter of the cap.

A cap which surrounds at least the igniting portion of the igniter and may be disposed in a direction orthogonal to the axial direction of the inflator housing is provided, a groove or a notch may be formed in a desired shape may be provided at a portion, in a peripheral face of the cap, which is exactly opposite to the rupturable plate; and a portion of the cap having the desired shape is deformed to rupture towards the rupturable plate and come in contact with the rupturable plate by action of a rupturing energy discharged from the igniter.

It is preferable that the desired shape portion formed by the groove or the notch has an arrowhead shape for making it easy to rupture the rupturable plate.

The rupturable plate may be ruptured by a multiplier effect of an impact due to collision to the deformed portion of the cap, impact of a rupturing energy itself discharged from the hole produced at the deformed portion and an increase of an internal pressure. Alternatively, the rupturable plate may be ruptured only by the impact due to a collision to the deformed portion of the cap.

Since the deformed portion is integrated with the cap before activation of the igniter in this manner, such a member as the independent piston shown in U.S. patent Publication No. 2002/0093182 is not required. Further, in case of rupturing the rupturable plate by the multiplier effect, the plate is not ruptured by a single means such as a piston in the above prior art, so that the deformed portion does not have to be necessarily thick.

The pressurized gas may be charged in a single space.

By charging the pressurized gas in the single space, the structure and assembling of the inflator can be simplified because the charging of the pressurized gas can be achieved rapidly at a time.

In a second aspect of the present invention, an inflator comprises a cylindrical inflator housing which is closed at one end thereof and opened at the other end and in which a pressurized gas is charged, and a diffuser portion which is connected to the opening portion of the inflator housing, and has a gas discharge port, wherein at least one portion of a gas discharge passage extending from the inflator housing to the gas discharge port of the diffuser portion is closed by a flat plate-shaped rupturable plate, and the pressurized gas is charged in a single space;

an igniter for rupturing the rupturable plate is disposed in the gas discharge passage such that the axial direction of the inflator housing and the axial direction of the igniter obliquely cross with each other; and means causing a rupturing energy generated by activation of the igniter to act in an oblique direction to the rupturable plate to rupture the rupturable plate.

The angle defined between the axial direction of the inflator housing and the axial direction of the igniter is preferably an acute angle, more preferably an angle of 60° or less, further preferably an angle of 50° or less, and especially preferably an angle of 40° or less.

The second aspect of the present invention allows the entire inflator to be more compact compared with the first aspect of the present invention. Further, the same effect as that in the first aspect of the present invention can also be achieved. Furthermore, by charging the pressurized gas in the single space, the structure of the inflator can be simplified.

A diffuser tube having a second gas discharge port may be further connected to the gas discharge port of the diffuser portion.

By using the above diffuser tube, mountability of the inflator to the module can be improved by adjusting the diameter or the length of the diffuser tube according to the shape of the module while maintaining the shape of the diffuser portion unchanged.

The diffuser tube may be arranged such that the diffuser tube is coaxial to the inflator housing or the central axis of the inflator housing and the central axis of the diffuser tube are parallel to each other.

The diffuser tube may have plural second gas discharge ports in a peripheral face thereof, and it is preferable that the plural second gas discharge ports are provided circumferentially at equal intervals.

By forming the gas discharge ports in this manner, even when the inflator is activated due to a fire or the like and the pressurized gas is ejected from the gas discharge port during transportation to storage of the inflator, the inflator is prevented from jumping out like a rocket. For example, when only a single gas discharge port is provided, the inflator jumps out like a rocket due to ejection of the pressurized gas, which is very dangerous.

A filter which catches fragments of the rupturable plate may be disposed in the gas discharge passage extending from the rupturable plate to the gas discharge port or to the second gas discharge port.

According to the inflator of the present invention, an inflator can be made compact entirely, and a mounting workability of the inflator to a module during assembling of an air bag system can be improved. Further, since a rupturing ability of a rupturable plate at the time of actuation of an inflator is improved, the reliability of the inflator can be more improved as a product.

DETAILED DESCRIPTION OF THE INVENTION (1) Embodiment 1

Figure 1:
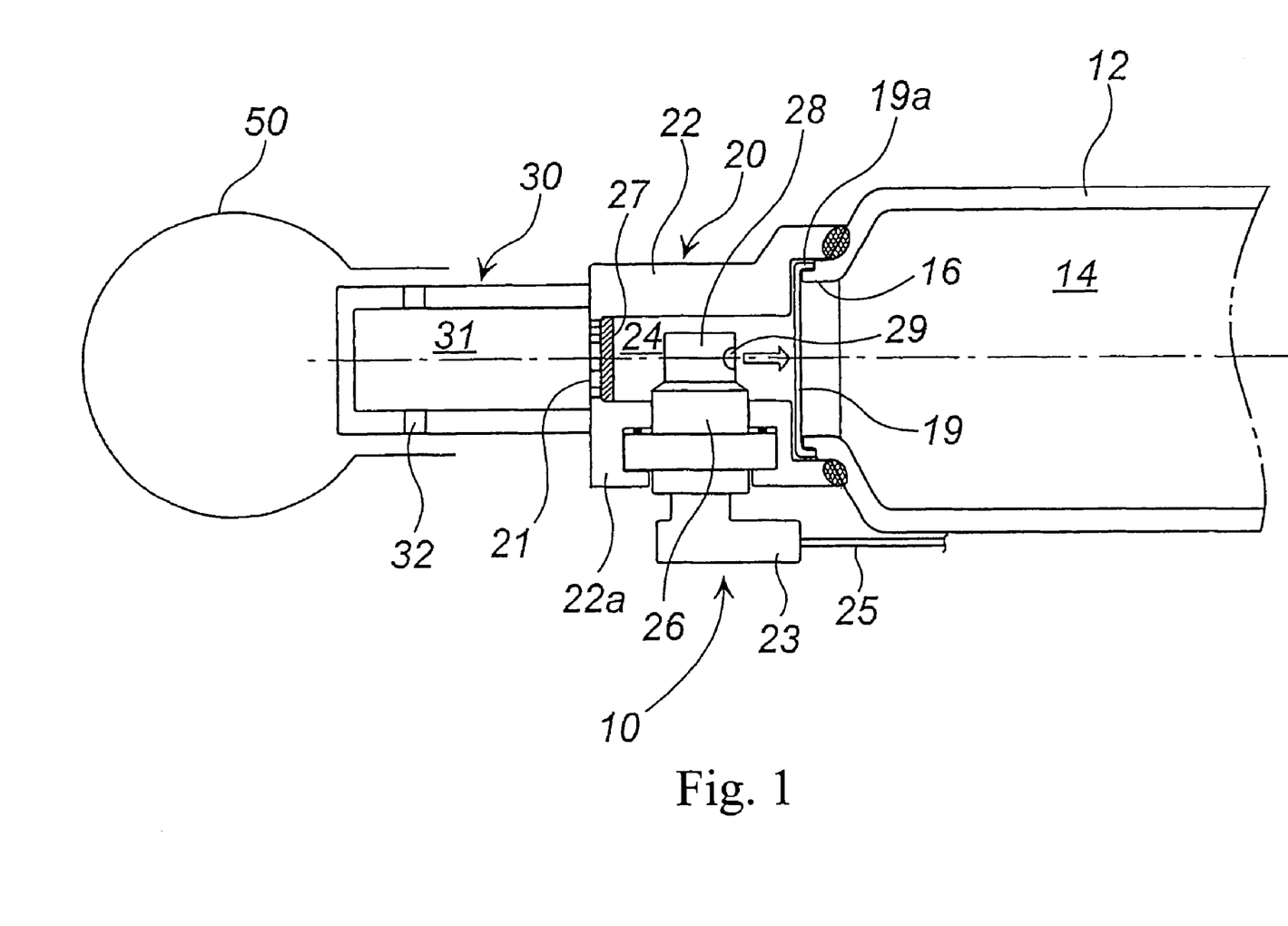
FIG. 1 is an axial partially sectional view of an inflator.

One embodiment of the present invention will be explained with reference to FIG. 1. FIG. 1 is an axial partially sectional view of an inflator 10.

A cylindrical inflator housing 12 has an opening portion at one end, and the other end is closed. The inner space 14 thereof is charged with a pressurized medium comprising an inert gas such as argon, helium or the like, or a nitrogen gas at the maximum pressure of about 70,000 kPa. Such a pressurized gas is charged in only the inner space 14.

The inflator housing 12 may be produced by swaging or spinning a pipe, and an existent gas cylinder may be utilized as the inflator housing as it is. When the swaging work or the spinning work is applied to a pipe, the pipe is closed while a small hole serving as a charging hole for charging a pressurized gas is left at one end side thereof.

After the inflator housing 12 is connected with a diffuser portion 20, a pressurized gas is charged from the small hole provided on a peripheral face or a closed end face of the inflator housing 12 and a sealing pin inserted in the small hole. Thereafter, the inflator housing 12 is welded at the sealing pin to be closed completely.

An outer shell of the diffuser portion 20 is formed of a diffuser portion housing and an inner space 24 thereof constitutes a gas discharge passage.

One end of the diffuser 20 is connected to an opening portion 16 of the inflator housing 12 and the other end thereof is provided with gas discharge ports 21. A filter 27 made of a wire mesh or the like is provided adjacent the gas discharge ports 21. An outer connection portion of the inflator housing 12 and the diffuser portion 20 is welded and fixed.

A disc-shaped rupturable plate 19 is mounted in a connection portion between the opening portion 16 of the inflator housing 12 and the diffuser portion 20 by welding and fixing a peripheral edge 19a thereof to a peripheral edge of the opening portion of the inflator housing 12. A pressurized gas inside the inflator housing 12 is prevented from flowing out before actuation of the inflator 10 by the rupturable plate 19.

Since the rupturable plate 19 receives a pressure of the pressurized gas and deforms like a bowl projecting towards the diffuser portion 20, and an apex of the projecting portion is positioned at the central portion of the rupturable plate 19, a portion of the rupturable plate including the central portion is ruptured to open a closed gas discharge passage at the time of actuation of the inflator 10.

An electric type igniter 26 is accommodated inside the diffuser portion 20 having an igniting portion projected inside the inner space 24 maintained at a normal pressure. The igniter 26 is mounted such that the central axis of the igniter 26 and the central axis of the inflator housing 12 are orthogonal to each other, and the igniter 26 is fixed by crimping one portion 22a of the diffuser portion housing 22.

The igniting portion of the igniter 26 is covered with a cup 28, a hole 29 is provided in a peripheral face of the cup 28, and the hole 29 is closed, from the inside, by a sealing tape made of aluminum to form a fragile portion. The hole 29 and the rupturable plate 19 (the central portion of the rupturable plate 19) exactly oppose one another.

The fragile portion can be formed by providing a portion surrounded by a groove or a portion having a notch on a side face of the cup 28 instead of a combination of the hole 29 and the sealing tape. The portion surrounded by a groove is one such as a groove (a continuous groove or a dotted-line groove) formed in a circular shape and the portion having a notch is one such as a notch (a continuous notch or a dotted-line notch) formed in a cross shape on the cup.

One portion of the igniter 26 is protruded outside the inflator 10, the protruded portion of the igniter 26 is fitted to a connector 23, and the connector 23 is connected with a lead wire 25 for sending an activation signal and a current to the igniter 26. A direction in which the lead wire 25 extends is different from a mounting direction of an air bag 50 but it is coincident with an axial direction of the inflator housing 12.

In the inflator 10, since the extending direction of the lead wire 25 can be restricted in this manner, the air bag 50 does not interfere with a wiring work of the lead wire 25 during assembling an air bag system including the inflator 10. On the contrary, the lead wire 25 does not interfere with a work for mounting the inflator 10 to the module.

The diffuser portion 20 is connected with a diffuser tube 30 coaxially with the inflator housing 12, and the inner space 31 constitutes a gas discharge passage.

The diffuser tube 30 is connected to the diffuser portion 20 such that it encloses the gas discharge ports 21 at one end opening portion thereof and the diffuser tube 30 has plural second gas discharge ports 32 on a peripheral face of the other end portion thereof.

A plurality of second discharge ports are formed on the peripheral face of the diffuser tube 30 at equal intervals. The formation of the plurality of second discharge ports at equal intervals can include, for example, four ports formed at equal intervals at an angle of 90° C., six ports formed at equal intervals at an angle of 60° C., eight ports formed at equal intervals at an angle of 45° C., as viewed from a widthwise section, and it may include a case that the number of the second gas discharge ports is an odd number if respective intervals are equal.

By arranging the plurality of second gas discharge holes 32 at equal intervals in this manner, even when an inflator is actuated and the pressurized gas is ejected from the second gas discharge holes 36 due to a fire or the like during transportation, the inflator is prevented from jumping out like a rocket. The inner space 14 of the inflator housing 12, the inner space 24 of the diffuser portion 20 and the inner space 31 of the diffuser tube 30 constitute a gas discharge passage, and the pressurized gas inside the inflator housing 12 moves in the above-described order to be discharged from the second gas discharge ports 32, thereby inflating and developing the air bag 50 mounted to cover the second gas discharge ports 32.

When the inflator 10 is actuated by an activation of the igniter 26, the priming in the igniting portion is ignited and burnt to generate an igniting energy (a rupturing energy). Since the rupturing energy breaks the sealing tape constituting the fragile portion of the cup 28 covering the igniting portion to open the hole 29, the rupturing energy is discharged to be concentrated on the central portion of the rupturable plate 19 which exactly opposes the hole 29. As a result, the rupturable plate 19 is instantaneously ruptured, and the pressurized gas in the inner space 14 moves through the gas discharge passage to be ejected from the second gas discharge ports 32, thereby inflating the air bag 50. Incidentally, since fragments of the rupturable plate 19 are caught by the filter 27, the fragments are prevented from flowing into the air bag 50.

(2) Embodiment 2

Figure 2A:
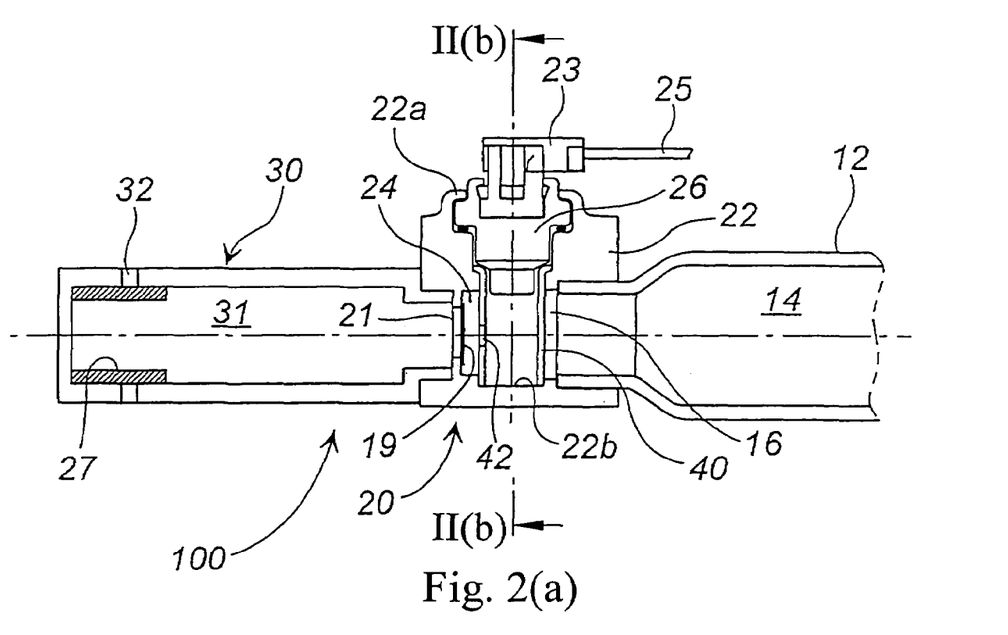
FIG. 2(a) is an axial partially sectional view of an inflator and FIG. 2(b) is a radial partially sectional view of the inflator.

Another embodiment will be explained with reference to FIGS. 2(a) and 2(b). FIG. 2(a) is an axial partially sectional view of an inflator 100 and FIG. 2(b) is a radial partially sectional view of a diffuser portion 20 in FIG. 2(a).

Figure 2B:
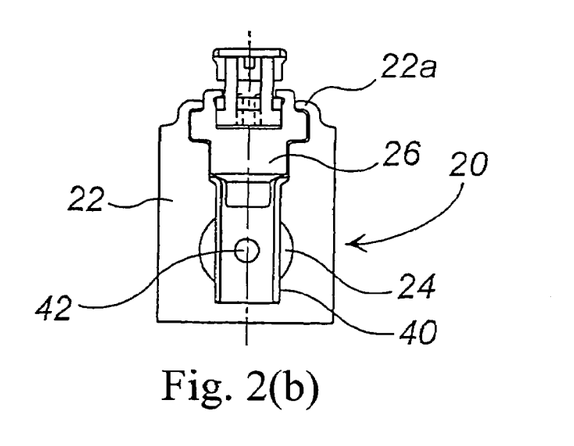

The inflator 100 shown in FIGS. 2(a) and 2(b) has a structure similar to the inflator 10 shown in FIG. 1, and the same reference numerals as those used in FIG. 1 are used for indicating the same parts in FIGS. 2(a) and 2(b). Differences between the structure in FIGS. 2(a) and 2(b) and that in FIG. 1 will be explained.

As shown in FIG. 2(a), a cylindrical guiding passage 40 for guiding a rupturing energy discharged from the igniter 26 to the rupturable plate 19 is provided inside the diffuser portion 20. An opening portion of the cylindrical guiding passage 40 at one end encloses an igniting portion of the igniter 26 and an opening portion thereof at the other end is fitted in an circular hole 22b provided in an inner wall face of the diffuser portion housing 22. An outer diameter of the cylindrical guiding passage 40 is substantially equal to an inner diameter of the circular hole 22b.

A guiding hole 42 is provided on a peripheral face of the cylindrical guiding passage 40 and at a position exactly opposing the central portion of the rupturable plate 19, and the guiding hole 42 is open.

The rupturable plate 19 is provided at a gas discharge port 21 which is a connection portion between the diffuser portion 20 and the diffuser tube 30. For this reason, the pressurized gas is charged in a single space comprising the inner space 14, the cylindrical guiding passage 40 in communication with the inner space 14 through a guiding hole 42, and the inner space 24.

A cylindrical filter 27 is provided inside the second discharge ports 32 provided in the diffuser tube 30.

Incidentally, as shown in FIG. 2(b), since an outer diameter of the cylindrical guiding passage 40 is adjusted not to close the inner space 24 constituting the gas discharge passage, movement of the pressurized gas is not prevented.

When the igniter 26 is activated, a priming in the igniting portion is ignited and burnt to produce an igniting energy (a rupturing energy). After the rupturing energy is discharged into the cylindrical guiding passage 40, it is discharged from the guiding hole 42 facing the central portion of the rupturable plate 19. As a result, the rupturable plate 19 is instantaneously ruptured, the pressurized gas inside the inner space 14 and the inner space 24 moves through the gas discharge passage to be ejected from the second gas discharge ports 32, thereby inflating an air bag. In this case, since fragments of the rupturable plate 19 are caught by the filter 27, the fragments are prevented from flowing into the air bag.

(3) Embodiment 3

Figure 3A:
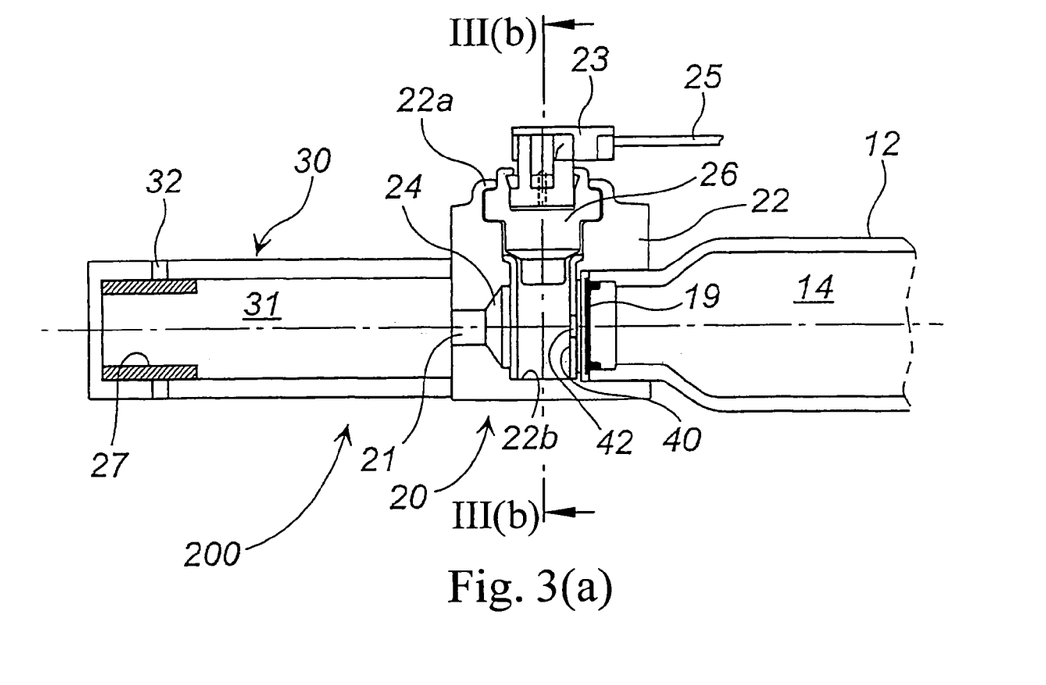
FIG. 3(a) is an axial partially sectional view of an inflator and FIG. 3(b) is a radial partially sectional view of the inflator.

Another embodiment will be explained with reference to FIGS. 3(a) and 3(b). FIG. 3(a) is an axial partially sectional view of an inflator 200 and FIG. 3(b) is a radial partially sectional view of a diffuser portion 20 in FIG. 3(a).

Figure 3B:
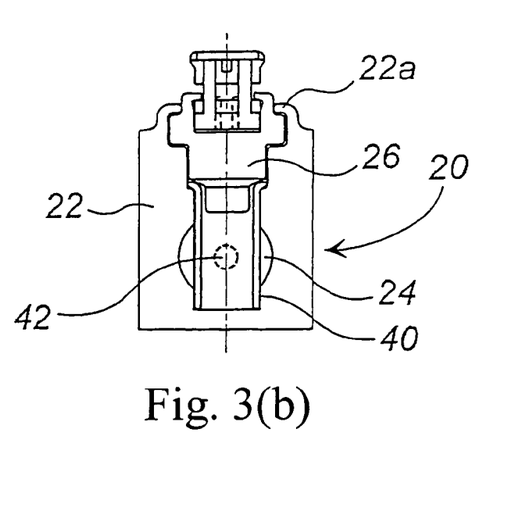

The inflator 200 shown in FIGS. 3(a) and 3(b) has a structure similar to the inflator 100 shown in FIGS. 2(a) and 2(b), and the same reference numerals as those used in FIG. 1 and FIGS. 2(a) and 2(b) are used for indicating the same parts in FIGS. 3(a) and 3(b). Differences between the structure in FIGS. 3(a) and 3(b) and that in FIGS. 2(a) and 2(b) will be explained.

In an inflator 200, since the opening portion 16 of the inflator housing 12 is provided with the rupturable plate 19 and a pressurized gas is charged only in the inner space 14, the inner space 24 is always maintained at a normal pressure.

A guiding hole 42 of the cylindrical guiding passage 40 is provided at a position exactly opposing the central portion of the rupturable plate 19.

The inflator 200 operates in the same manner as the inflator 100 so that the same effect as that in the inflator 100 can be achieved. Incidentally, in this embodiment, such a structure is employed that a discharge amount of pressurized gas is adjusted at the gas discharge port 21 by throttling the diameter of the gas discharge port 21. A similar structure can be applied in the other embodiments. Besides, adjustment of the gas discharged amount can be conducted at the second gas discharge ports 32, a clearance formed between the inner space 24 and the cylindrical guiding passage 40, and the opening portion 16 of the inflator housing 12.

(4) Embodiment 4

Figures 4A, 4B, 4C:
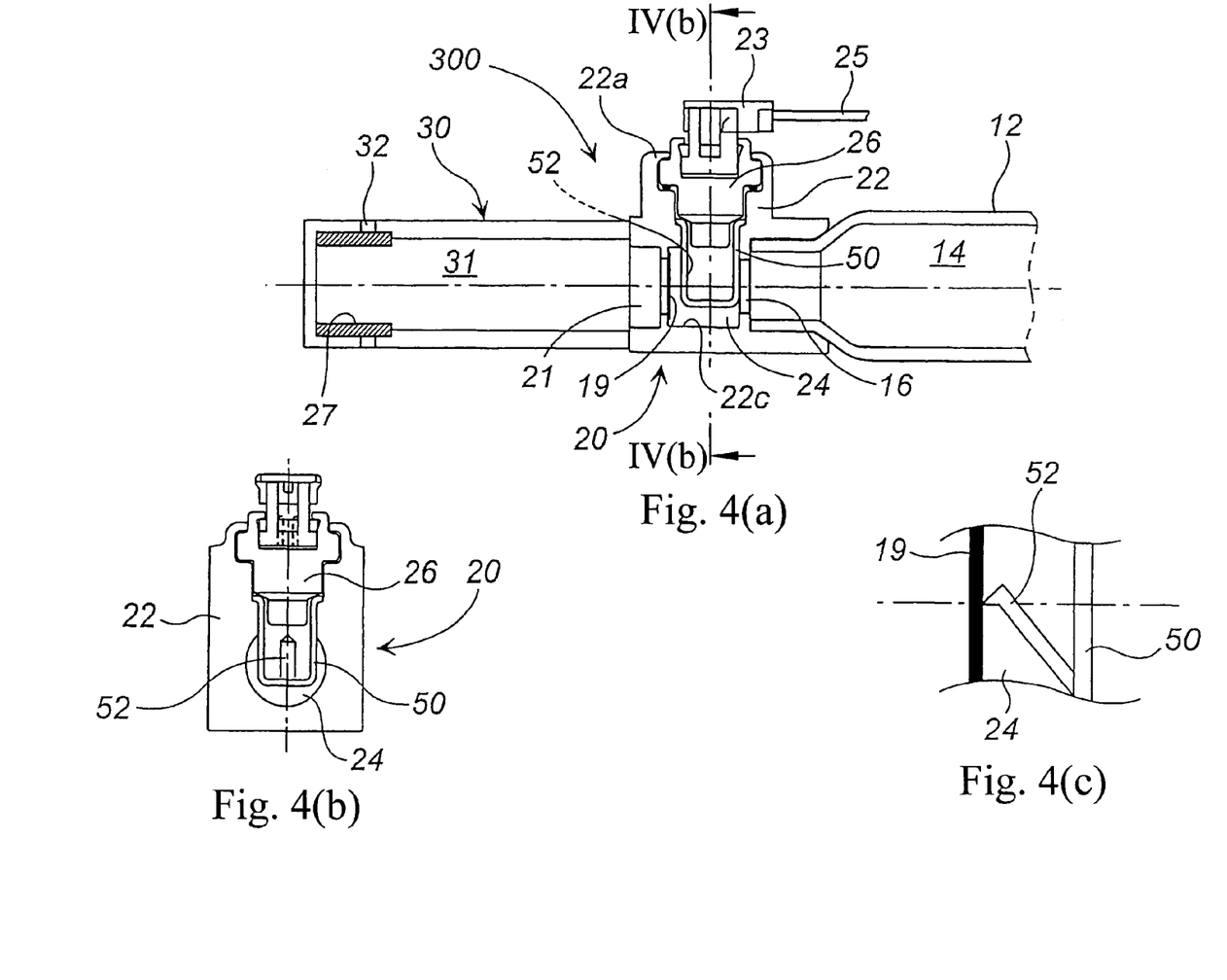
FIG. 4(a) is an axial partially sectional view of an inflator.
FIG. 4(b) is a radial partially sectional view of the inflator.
FIG. 4(c) is a radial partially sectional view showing an activation state of the inflator.

Another embodiment will be explained with reference to FIGS. 4(*a*), 4(*b*) and 4(*c*). FIG. 4(*a*) is an axial partially sectional view of an inflator 300, FIG. 4(*b*) is a radial partially sectional view in a diffuser portion 20 shown in FIG. 4(*a*), and FIG. 4(*c*) is a view for explaining an operation state of the inflator 300.

The inflator 300 shown in FIGS. 4(*a*)-4(*c*) has a structure similar to the inflator 10 shown in FIG. 1, and the same reference numerals as those used in FIG. 1 are used for indicating the same parts in FIGS. 4(*a*)-4(*c*) Differences between the structure in FIGS. 4(*a*)-4(*c*) and that in FIG. 1 will be explained.

As shown in FIG. 4(*a*), a cap 50 for rupturing the rupturable plate 19 utilizing a rupturing energy discharged from the igniter 26 is provided inside the diffuser portion 20. The cap 50 surrounds the igniting portion of the igniter 26 at a side of an opening portion thereof and a closed end face thereof does not abut on an inner wall face 22*c* of the diffuser housing 22 and a distance is provided between the closed end face and the inner wall surface.

As shown in FIG. 4(*b*), an arrowhead like deformed portion, comprising four-side notches, is provided in a peripheral surface of the cap 50 at the position facing the center of the rupturable plate 19. Since a notch is not provided at a proximal end portion of the arrowhead-shaped deforming portion 52, the arrowhead-shaped deforming portion 52 does not separate from the peripheral face of the cap 50.

Incidentally, as shown in FIG. 4(*c*), by forming a distal end portion of the arrowhead-like deforming portion 52 in a slightly curved shape in advance, a contact area of the arrowhead-shaped deforming portion 52 with the rupturable plate 19 becomes small and the arrowhead-shaped deforming portion can apply a stronger impact to the central portion of the rupturable plate 19 so that the rupturing ability of the rupturable plate can be increased.

The rupturable plate 19 is provided at the gas discharge port 21 which is a connection portion between the diffuser portion 20 and the diffuser tube 30. For this reason, the pressurized gas is charged in a single space comprising the inner space 14, the inner space of the cap 50 which is in communication via the notch, and the inner space 24.

A cylindrical filter 27 is provided inside the second gas discharge ports 32 provided in the diffuser tube 30.

Incidentally, as shown in FIG. 4(*b*), since the outer diameter and the length of the cap 50 are adjusted not to close the inner space 24 constituting the gas discharge passage, movement of the pressurized gas is not blocked.

When the inflator 300 is by activating the igniter 26, the priming in the igniting portion is ignited and burnt to generate an igniting energy (a rupturing energy). Since the rupturing energy is discharged in the cap 50 and an internal pressure is increased, the notched arrowhead-shaped deforming portion 52 is pressed.

As shown in FIG. 4(*c*), the pressed arrowhead-shape deforming portion 52 deforms to bend towards the rupturable plate 19 and collide against the rupturable plate 19. The rupturable plate 19 is instantaneously ruptured by a multiplier effect of an impact due to collision with the arrowhead-shaped deforming portion 52, an impact of the rupturing energy itself discharged from the hole produced after the arrowhead-shaped deforming portion 52 is bent, and the increase in the internal pressure.

As a result, the pressurized gas in the inner space 14 and the inner space 24 moves the gas discharge passage to be ejected from the second gas discharge ports 32 and inflate an air bag. Incidentally, fragments of the rupturable plate 19 are caught by the filter 27, the fragments are prevented from flowing into the air bag.

(5) Embodiment 5

Figure 5A:
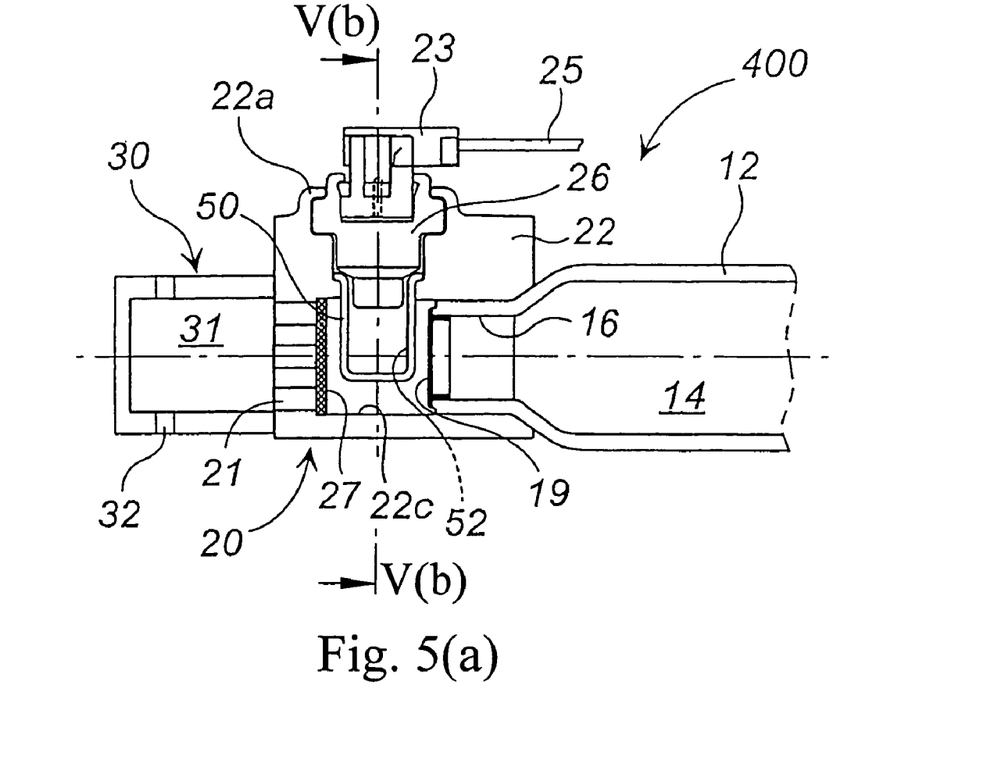
FIG. 5(a) is an axial partially sectional view of an inflator and FIG. 5(b) is a radial partially sectional view of the inflator.
Figure 5B:
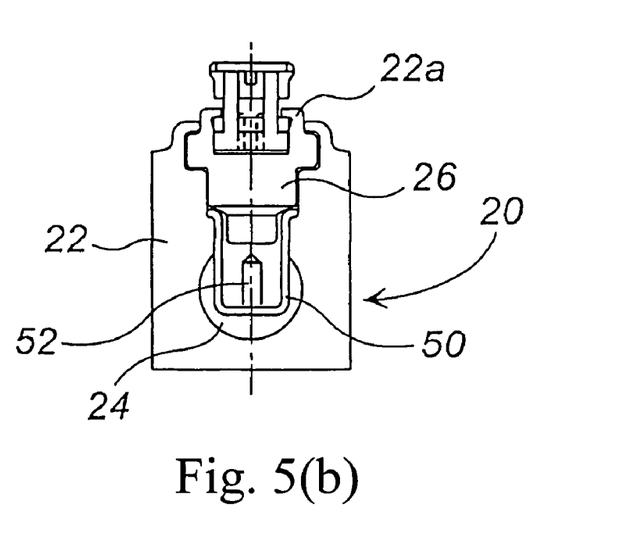

Another embodiment will be explained with reference to FIGS. 5(*a*) and 5(*b*). FIG. 5(*a*) is an axial partially sectional view of an inflator 400 and FIG. 5(*b*) is a radial partially sectional view of a diffuser portion 20 in FIG. 5(*a*).

An inflator 400 shown in FIGS. 5(*a*) and 5(*b*) has a structure similar to the inflator 300 shown in FIGS. 4(*a*)-4(*c*), and the same reference numerals as those used in FIG. 1 and FIGS. 4(*a*)-4(*c*) are used for indicating the same parts in FIGS. 5(*a*) and 5(*b*). Differences between the structure in FIGS. 5(*a*) and 5(*b*) and that in FIGS. 4(*a*)-4(*c*) will be explained.

In the inflator 400, the opening portion 16 of the inflator housing 12 is provided with the rupturable plate 19 and a pressurized gas is charged in only the inner space 14, so that the inner space 24 is maintained at normal pressure.

An arrowhead-shaped deforming portion 52, comprising four-side notches, is provided on a peripheral face of the cap 50 at a portion thereof facing the center of the rupturable plate 19. Since a notch is not provided at a proximal end portion of the arrowhead-shaped deforming portion 52, the arrowhead-shaped deforming portion 52 does not separate from the peripheral face. The arrowhead-like deforming portion 52 may be formed to have a slightly curved shape at a distal end portion like the case shown in FIG. 4(*c*).

The inflator 400 operates in the same manner as the inflator 300 so that the same effect as that in the inflator 300 can be achieved.

(6) Embodiment 6

Figure 6:
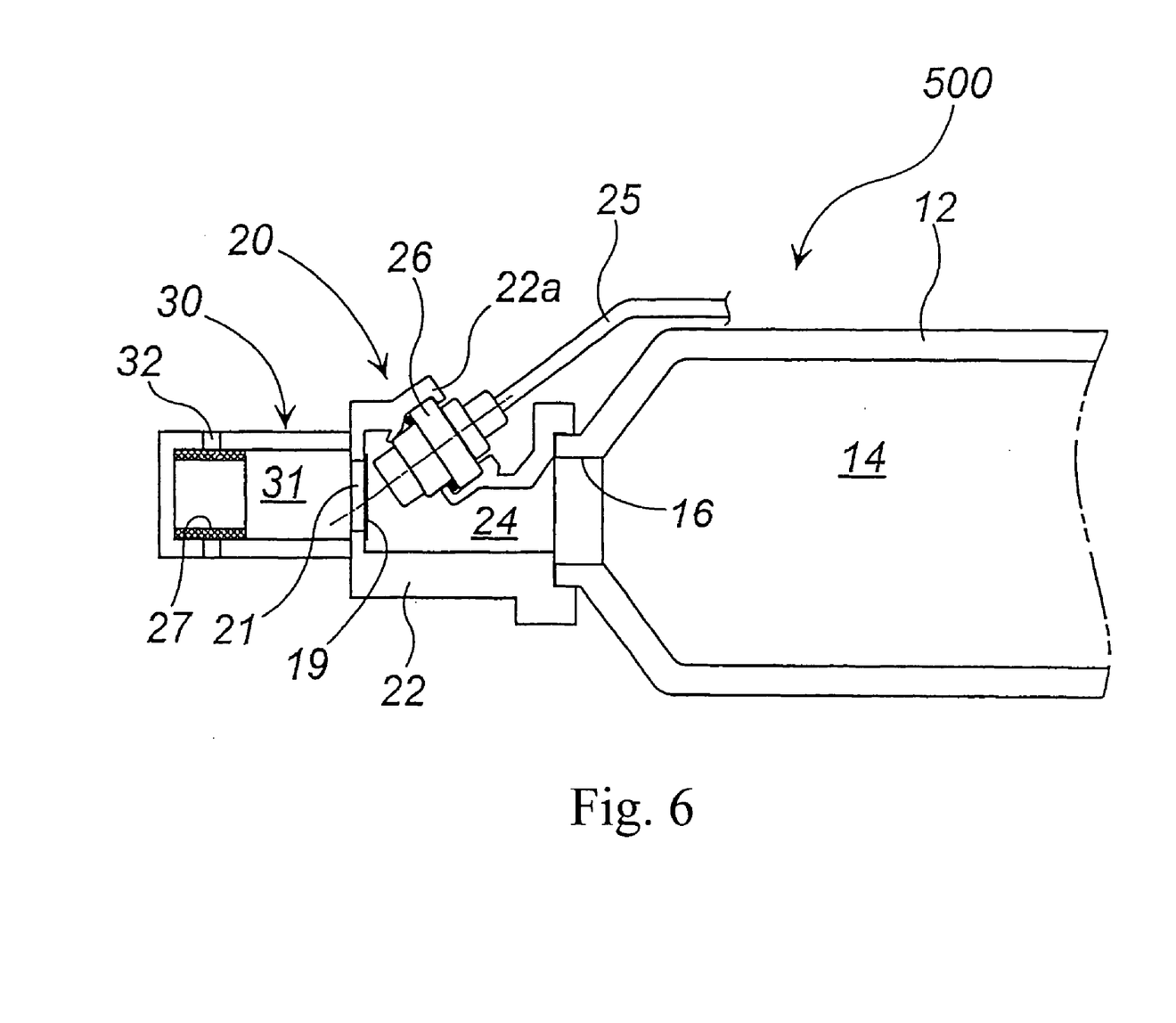
FIG. 6 is an axial partially sectional view of an inflator.

Another embodiment will be explained with reference to FIG. 6. FIG. 6 is an axial partially sectional view of an inflator 500.

The inflator 500 shown in FIG. 6 has a structure similar to the inflator 10 shown in FIG. 1, and the same reference numerals as those used in FIG. 1 are used for indicating the same parts in FIG. 6. Differences between the structure in FIG. 6 and that in FIG. 1 will be explained.

The igniter 26 is mounted such that the central axis of the igniter 26 becomes oblique to the central axis of the inflator housing 12.

An angle defined between the central axis of the igniter 26 and the central axis of the inflator housing 12 is an acute angle, and it is preferably 60° or less, more preferably 50° or less, and further preferably 40° or less.

The rupturable plate 19 is provided at the gas discharge port 21 which is the connection portion between the diffuser portion 20 and the diffuser tube 30. For this reason, a pressurized gas is charged in a single space comprising the inner space 14 and the inner space 24.

The cylindrical filter 27 is provided inside the second gas discharge port 32 provided in the diffuser tube 30.

As apparent from comparison between the inflator 500 shown in FIG. 6 and the inflators shown in FIG. 1 to FIGS. 5(a) and 5(b), in the inflator 500, the acting direction of the rupturing energy from the igniter 26 does not exactly oppose the rupturing plate 19 but the rupturable plate 19 and the igniting portion of the igniter 26 are much closer to each other, so that rupturing ability to the rupturable plate 19 is high, and the igniter 19 is mounted in an oblique direction to the central axis of the inflator housing 12, so that the whole inflator can be made further compact.

An air bag system using the inflator of the present invention can be mounted as an air bag system where each of the inflator shown in FIG. 1 to FIG. 6 is used and activation signal-outputting means comprising an impact sensor and a control unit is combined with a module case in which each of the inflators shown in FIG. 1 to FIG. 6 and an air bag are accommodated.

The inflator of the present invention can be applied to various inflators such as an air bag inflator for a driver side, an air bag inflator for a passenger side, an inflator for an air bag for a side collision, an inflator for a curtain air bag, an inflator for a knee-bolster, an inflator for an inflatable seat belt, an inflator for a tubular system, and an inflator for a pretensioner.

The invention claimed is:

1. An inflator, comprising:
   a cylindrical inflator housing which is closed at one end thereof and having an opening at the other end, and in which a pressurized gas is charged;
   a diffuser portion connected to the opening of the inflator housing, and having a gas discharge port therein;
   a rupturable plate that closes at least one portion of a gas discharge passage, the gas discharge passage extending from the inflator housing to the gas discharge port of the diffuser portion;
   an igniter including an igniting portion covered by a cup and provided within the diffuser portion such that an axial direction of the inflator housing is orthogonal to an axial direction of the igniter, the igniter generating a combustion product upon activation thereof; and
   a fragile portion provided in a peripheral surface of the cup and opposing the rupturable plate, such that the combustion product is directed towards a single direction.

2. An inflator according to claim 1, wherein said fragile portion is ruptured upon an activation of the igniter and a rupturing energy acts on the rupturable plate from the fragile portion.

3. An inflator according to claim 1, wherein the fragile portion provided in the igniter is constituted with a combination of a hole provided in the cup covering the igniting portion of the igniter and a sealing tape closing the hole from the inside of the cup.

4. An inflator according to claim 1, wherein the fragile portion provided in the igniter comprises a portion surrounded by a groove or a portion with a notch, which is provided in a side face of the cup covering the igniting portion of the igniter.

5. An inflator according to claim 1, wherein the pressurized gas is charged in a single space defined by the cylindrical inflator housing and the diffuser portion.

6. An inflator according to claim 1, further comprising:
   a diffuser tube, having a second gas discharge port, connected to the gas discharge port of the diffuser portion.

7. An inflator according to claim 6, wherein the diffuser tube is arranged, such that a center axis of the diffuser tube and a center axis of the inflator housing coincide or are parallel to each other.

8. An inflator according to claim 6, wherein the diffuser tube has a plurality of second gas discharge ports in a peripheral face thereof, and the plurality of second gas discharge ports are provided circumferentially at equal intervals.

9. An inflator according to claim 8, further comprising:
   a filter, which catches fragments of the rupturable plate, being disposed in the diffuser tube.

10. An inflator according to claim 7, wherein the diffuser tube has a plurality of second gas discharge ports in a peripheral face thereof and the plural second gas discharge ports are provided circumferentially at equal intervals.

11. An inflator, comprising:
    a cylindrical inflator housing provided with an opening portion at one end thereof and a closed portion at the other end thereof, and including a pressurized gas therein;
    a diffuser portion connected to the opening portion and having a gas discharge port, the diffuser portion including therein a gas passage extending from the inflator housing to the gas discharge port;
    a rupturable plate that closes at least a portion of the gas passage;
    an igniter provided within the diffuser portion such that an axis of the igniter is perpendicular to an axis of the cylindrical inflator housing, the igniter generating a combustion product upon activation thereof; and
    a deforming member provided between the igniter and the rupturable plate, such that the deforming member is prevented from making a direct contact with the rupturable plate prior to activation of the inflator, and is deformed by the combustion product to cause the rupturable plate to rupture by a deformation thereof.

12. The inflator according to claim 11, wherein the deforming member is formed in a single piece and attached to the diffuser portion before activation of the inflator.

13. The inflator according to claim 12, wherein the deforming member is a circumferential portion of a cap that surrounds at least an igniting portion of the igniter and is disposed in a direction perpendicular to the axis of the cylindrical inflator housing.

14. The inflator according to claim 11, wherein the deforming member includes a weakened portion that deforms upon receiving the combustion product.

* * * * *